United States Patent
Cooper et al.

(10) Patent No.: US 7,155,678 B2
(45) Date of Patent: Dec. 26, 2006

(54) METHOD, SYSTEM, AND SOFTWARE FOR GENERATING AND DISPLAYING CUSTOM VIEWS FOR ACCESSING MULTIPLE APPLICATIONS

(75) Inventors: James Cooper, Silver Spring, MD (US); Deepak Bhatnagar, Burke, VA (US); Balamurugan Vellaiappan, Germantown, MD (US)

(73) Assignee: GXS, Inc., Gaithersburg, MD (US)

(*) Notice: Subject to any disclaimer, the term of this patent is extended or adjusted under 35 U.S.C. 154(b) by 526 days.

(21) Appl. No.: 09/942,840

(22) Filed: Aug. 31, 2001

(65) Prior Publication Data

US 2003/0043199 A1   Mar. 6, 2003

(51) Int. Cl.
*G06F 3/00* (2006.01)
*G06F 9/00* (2006.01)
*G06F 17/00* (2006.01)

(52) U.S. Cl. ............................. 715/744; 715/765
(58) Field of Classification Search ............... 345/762, 345/744, 765; 709/230; 707/10
See application file for complete search history.

(56) References Cited

U.S. PATENT DOCUMENTS

| | | | | |
|---|---|---|---|---|
| 5,767,853 A | * | 6/1998 | Yoshida et al. | 715/839 |
| 5,925,103 A | * | 7/1999 | Magallanes et al. | 709/230 |
| 6,512,526 B1 | * | 1/2003 | McGlothlin et al. | 345/762 |
| 6,571,245 B1 | * | 5/2003 | Huang et al. | 707/10 |
| 6,785,822 B1 | * | 8/2004 | Sadhwani-Tully | 726/28 |

* cited by examiner

*Primary Examiner*—Kristine Kincaid
*Assistant Examiner*—Boris Pesin
(74) *Attorney, Agent, or Firm*—Foley & Lardner LLP

(57) ABSTRACT

A computer implemented method, apparatus, and software for automatically generating and rendering a custom view including at least two viewlets from two different applications. A defined activity sequence is received from a user in which the activity sequence includes at least two viewlets from two applications, respectively. The received activity sequence is associated with the user. The activity sequence and the associated user are stored as a user context. A custom view is rendered to the user based on the stored user context.

23 Claims, 4 Drawing Sheets

METHOD, SYSTEM, AND SOFTWARE FOR GENERATING AND DISPLAYING CUSTOM VIEWS FOR ACCESSING MULTIPLE APPLICATIONS

BACKGROUND OF THE INVENTION

1. Field of the Invention

The present invention relates generally to customizable applications that allow a user to define a custom view that allows customizable access to activity sequences from different applications. More specifically, the present invention relates to a pattern to develop customizable applications, that enables a single software installation to meet personalization requirements of a diverse user-base by providing the ability to personalize and aggregate activity sequences originating from disparate applications based on the user's tasks.

2. Background of the Related Art

Currently, business processes confine users to specific sequences of activities spanning multiple applications. These predefined activity sequences may not be the most optimal for accomplishing a user's specific task, and therefore cost time and resources. Furthermore, the predefined sequence is often defined at an early stage of the software development lifecycle when the business processes are not well understood. Therefore, the predefined sequence often turns out to be sub-optimal for the users when the business process is implemented.

Another problem with the predefined activity sequences provided by many business applications is that different users often have different preferred sequences for accomplishing the same or different tasks. Therefore, the predefined sequence which may be suitable for one user may not be optimal for other users.

Another problem related to users accessing activity sequences from multiple applications is that users often need to separately login to the multiple applications in order to complete their business task that requires the coordinated access to activity sequences from the multiple applications. Furthermore, the user often needs to enter the same application at several different times while accessing other applications in between to accomplish their business task. This multiple logins to the various different applications as well as repeated logins to the same application are wasteful and inefficient.

Another problem with the prior art is that the activity sequences in the multiple applications (required, for example, by a business task) are performed by business persons who are not necessarily skilled in the various applications. Therefore, the process of repeatedly logging in and configuring the various applications to perform a task is inefficient and prone to errors since the users are not necessarily skilled in repeatedly logging in and configuring the applications to perform the business tasks.

Therefore, there is a need for a customizable application that allows a business user to customize the activity sequences from multiple applications so that the business user can perform the business task efficiently and also minimize the errors associated with repeated logging in and configuring of applications.

SUMMARY OF THE INVENTION

Therefore, it is a general object of the invention to alleviate the problems and shortcomings identified above.

In one aspect, the present invention provides a computer implemented method of automatically generating and rendering a custom view including at least two viewlets from two different applications, the method including: receiving a defined activity sequence from a user, wherein the activity sequence comprises at least two viewlets from two applications, respectively; associating the received activity sequence with the user; storing the activity sequence and associated user as a user context in a data store; and rendering a custom view to the user based on the stored user context.

In one aspect of the present invention the step of receiving the activity sequence includes: providing the user with a selection of available applications; receiving user selections of applications; providing the user with a list of viewlets for each of the applications selected by the user; and receiving the user selection of viewlets corresponding to the user's selection of applications.

In another aspect of the present invention the step of receiving the activity sequence includes: interactively providing suggestions to the user based on the applications selected by the user; and validating user selection of viewlets based one of a user and the applications.

In another aspect of the present invention, the step of receiving the defined activity sequence for a user includes defining the activity sequence based on a role associated with the user.

In one aspect, the present invention provides that the step of receiving the defined activity sequence for a user includes interactively providing suggestions to the user based on a role associated with the user.

In another aspect, the present invention provides that the step of storing the activity sequence as a user context includes storing information related to the user's login to the two applications.

In a further aspect of the present invention, the information related to the user's login to the two applications includes an access control list.

In one aspect, the present invention provides that the step of rendering a custom view includes: retrieving the user context for the user; extracting viewlets from applications based on user context; and generating the custom view for rendering using the extracted viewlets and a device context corresponding to the device used for rendering to the user.

In another aspect, the present invention provides that the step of rendering a custom view further includes: retrieving the user context for the user; logging into the two applications based on information related to the user's login to the two applications stored with the user context; upon successful logging in, extracting viewlets from the applications based on retrieved user context; and generating the custom view for rendering using the extracted viewlets and a device context corresponding to the device used for rendering.

In one important aspect, the present invention provides a computer readable data storage medium having program code (software) recorded thereon that is executable by a computer for rendering a custom view including at least two viewlets from two different applications, the program code configured to cause the computer to perform the following steps: receiving a defined activity sequence from a user, wherein the activity sequence comprises at least two viewlets from two applications, respectively; associating the received activity sequence with the user; storing the activity sequence and associated user as a user context in a data store; and rendering a custom view to the user based on the stored user context.

In another important aspect, the present invention provides a system for automatically generating and rendering a custom view including at least two viewlets from two different applications, the system including: a personalization engine that receives a defined activity sequence from a user, wherein the activity sequence comprises at least two viewlets from two applications, respectively; the personalization engine associating the received activity sequence with the user as a user context; a custom views data store that stores the user context; and a custom view generator that renders a custom view to the user based on the stored user context.

BRIEF DESCRIPTION OF THE DRAWINGS

The accompanying drawings, which are incorporated in and constitute a part of the specification, illustrate a presently preferred embodiment of the invention, and, together with the general description given above and the detailed description of the preferred embodiment given below, serve to explain the principles of the invention.

DESCRIPTION OF THE PREFERRED
EMBODIMENT(S)

Figure 1:
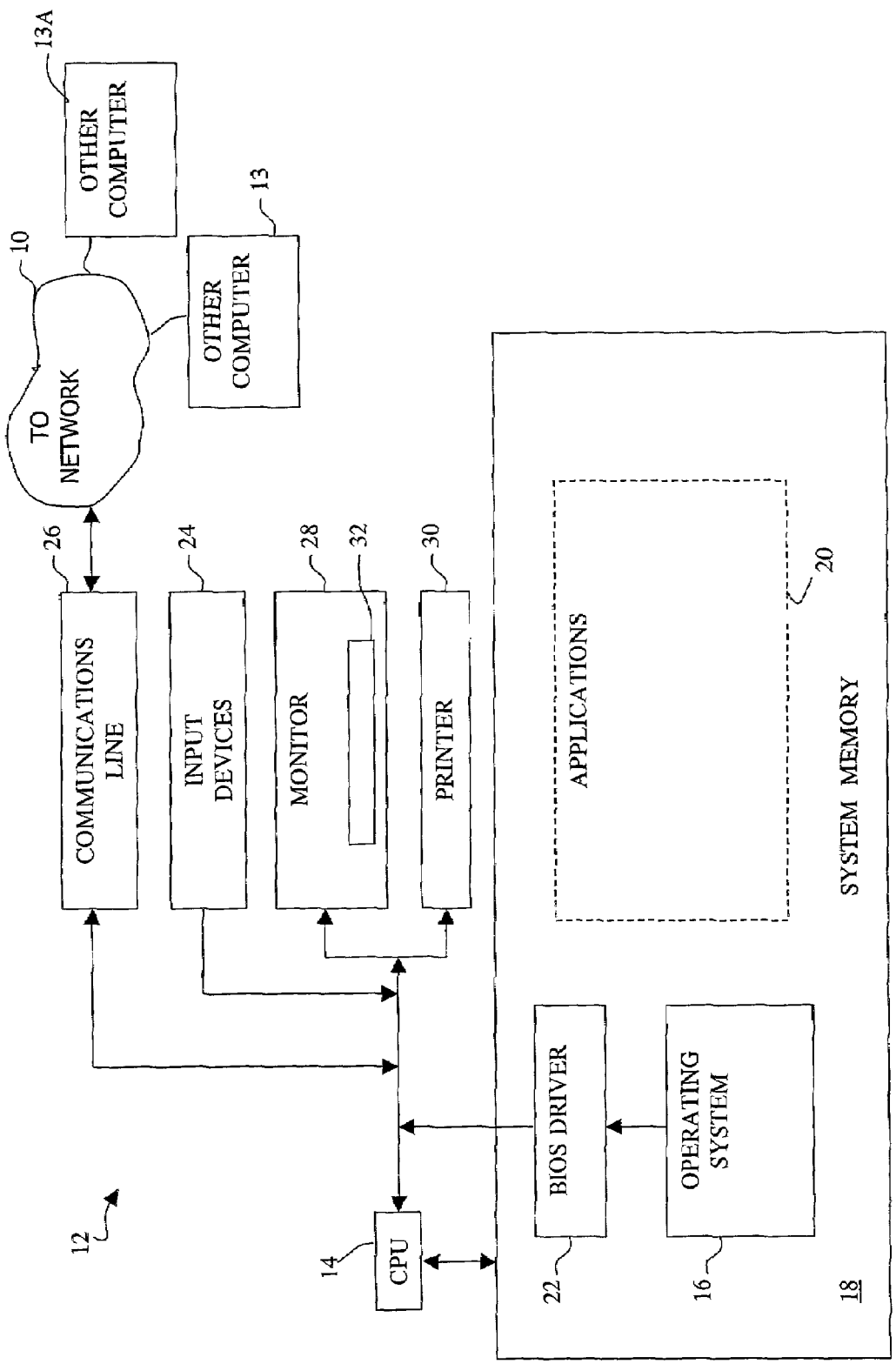
FIG. 1 is a block diagram showing the components of a general purpose computer system connected to an electronic network.

With reference to the figures, FIG. 1 is a block diagram showing the components of a general purpose computer system 12 connected to an electronic network 10, such as a computer network. The computer network 10 can also be a public network, such as the Internet or Metropolitan Area Network (MAN), or other private network, such as a corporate Local Area Network (LAN) or Wide Area Network (WAN), or a virtual private network. As shown in the FIG. 1, the computer system 12 includes a central processing unit (CPU) 14 connected to a system memory 18. The system memory 18 typically contains an operating system 16, a BIOS driver 22, and application programs 20. In addition, the computer system 12 contains input devices 24 such as a mouse and a keyboard 32, and output devices such as a printer 30 and a display monitor 28.

The computer system generally includes a communications interface 26, such as an ethernet card, to communicate to the electronic network 10. Other computer systems 13 and 13A may also be connected to the electronic network 10. One skilled in the art would recognize that the above system describes the typical components of a computer system connected to an electronic network. It should be appreciated that many other similar configurations are within the abilities of one skilled in the art and all of these configurations could be used with the methods of the present invention. Furthermore, it should be recognized that the computer system and network disclosed herein can be programmed and configured as queuing, data conversion, or storage sites, by one skilled in the art, to implement the method, system, and software discussed further herein.

In addition, one skilled in the art would recognize that the "computer" implemented invention described further herein may include components that are not computers per se but include devices such as Internet appliances and Programmable Logic Controllers (PLCs) that may be used to provide one or more of the functionalities discussed herein. Furthermore, while "electronic" networks are generically used to refer to the communications network connecting the processing sites of the present invention, one skilled in the art would recognize that such networks could be implemented using optical or other equivalent technologies.

One skilled in the art would recognize that other system configurations and data structures could be provided to implement the functionality of the present invention. All such configurations and data structures are considered to be within the scope of the present invention.

In this context, it is also to be understood that the present invention utilizes known security measures for transmission of electronic data across networks. Therefore, encryption, authentication, verification, and other security measures for transmission of electronic data across both public and private networks are provided, where necessary, using techniques that are well known to those skilled in the art.

As discussed earlier herein, currently, users of multi-application systems (i.e., whose task may span more than one application), are constrained to predefined sequences of actions within each application. Even if these actions are necessary to the completion of their task, there is the added cost of training and user error across various applications.

Definitions

To better understand the present invention, the following terms are defined as follows for the purposes of the present application. (1) An "application" is an ordered set of viewlets structured to allow a user to perform a specific set of tasks. (2) A "task," for example, can be represented as a use case in the Unified Modeling Language (UML). (3) A "viewlet" is a coherent set of operations required to perform a specific task. (4) A "canvas" or "custom view generator" renders viewlets based on a device context. (5) A "personalization engine" generates a user context based on predefined operations (or viewlets) stored in a custom views data store (or data repository). (6) A "device context" is a set of device specific instructions that specify how a viewlet is rendered (for example, displayed or other multimedia output). (7) A "user context" is a set of instructions and/or information that specifies a user's preferences and login related information (for example, an access control list).

Figure 2:
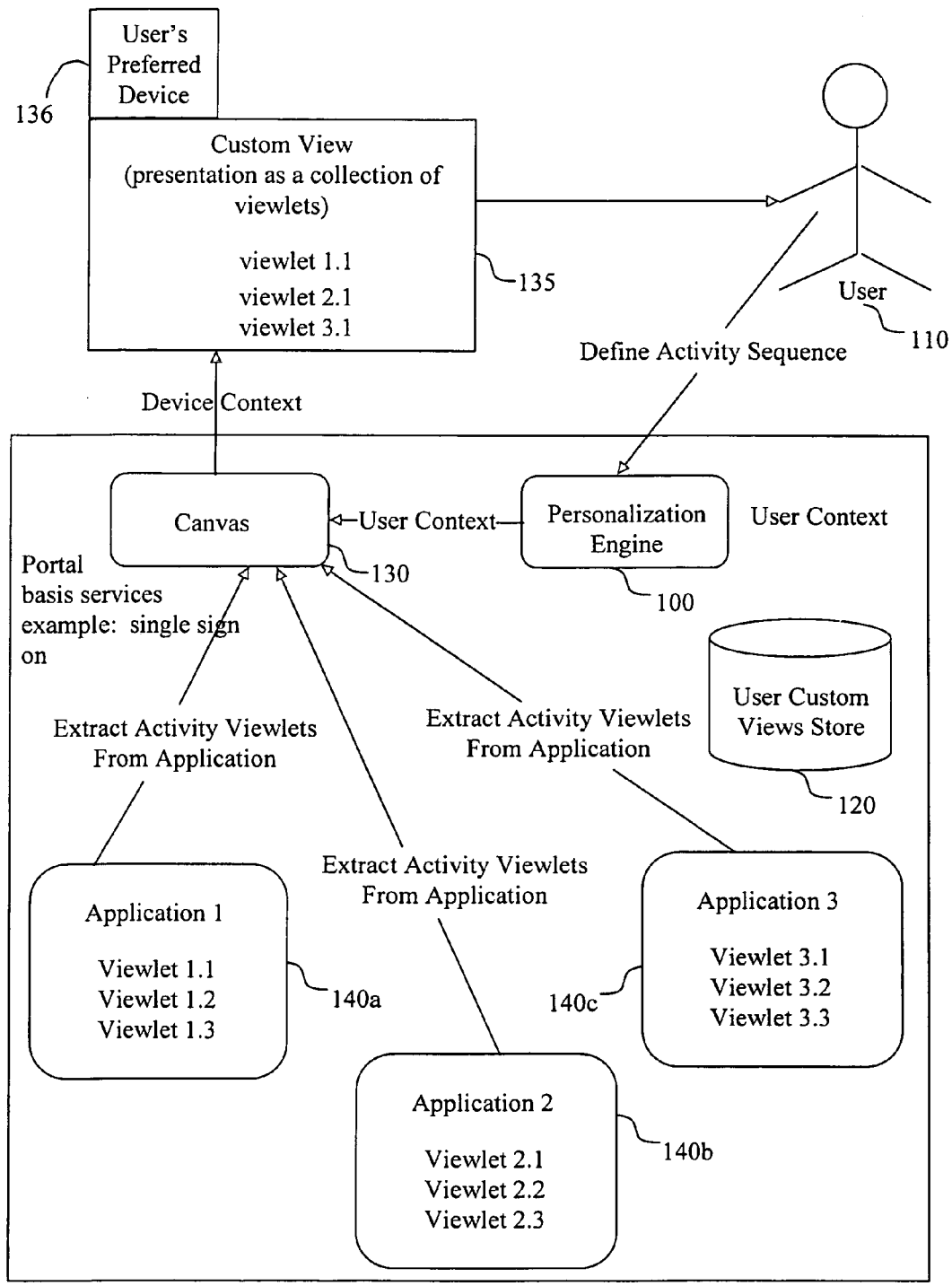
FIG. 2 is a block diagram showing the system components of a preferred embodiment of the present invention.

FIG. 2 illustrates the components of the system provided by the present invention that allows users to select relevant activities (or viewlets) spanning multiple applications necessary to complete their task. A personalization engine 100 interacts with a user 110 to define a user context for the user 110 and store the user context in a custom views data store 120.

Figure 3:
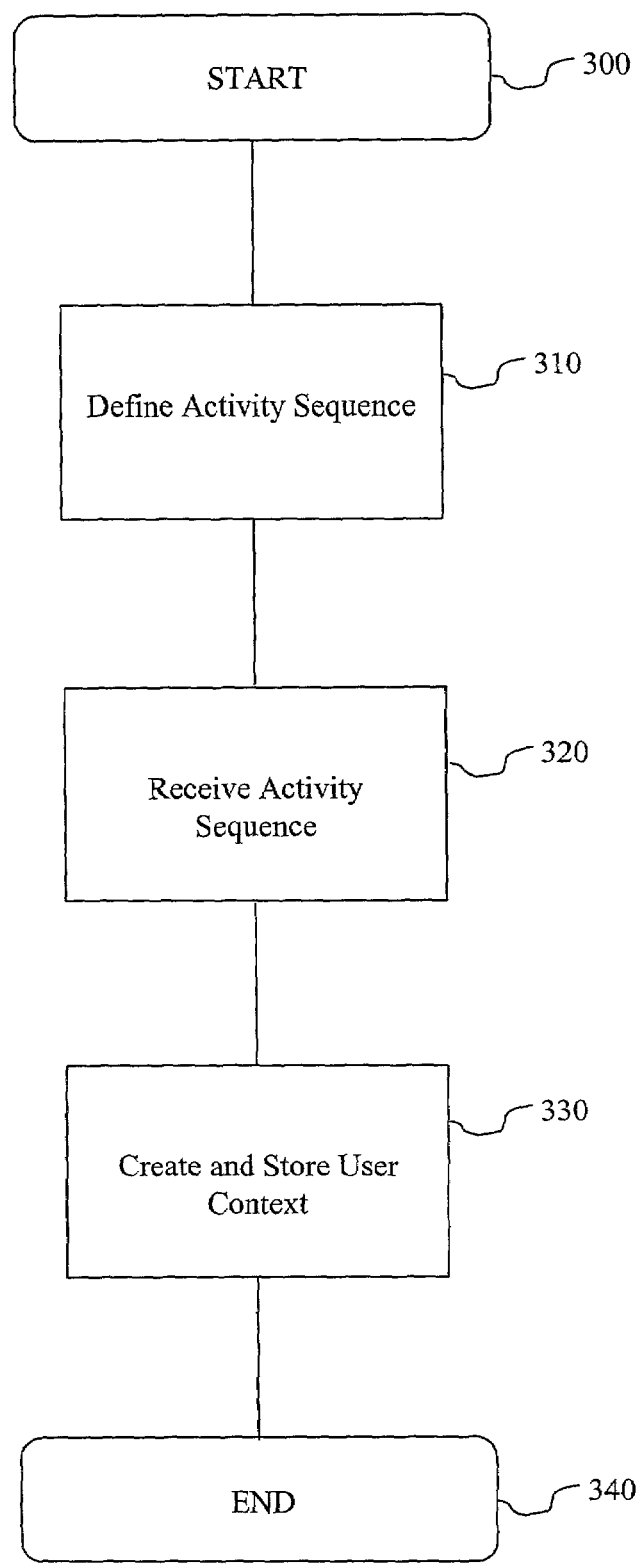
FIG. 3 is a flow chart illustrating a preferred embodiment of the method steps of creating user contexts according to the present invention.

FIG. 3 is flowchart that discusses one preferred embodiment of the steps for defining the user context. In step 310, the user 110 connects to the personalization engine 100 to define the activity sequences (or viewlets) that the user prefers in a custom view. For example, the user 110 may define that he prefers viewlet 1.1 from application 140a, viewlet 2.1 from application 140b and viewlet 3.1 from application 140c to comprise his custom view. This preference of the user is stored as a user context in the custom views data store 120. The user context is a set of instructions and/or information that records the viewlet (or activity sequence) preferences of the user and stores it correlated with the user.

It should be noted that the activity sequence selected by the user includes viewlets selected from different applications and can optionally include a sequence or other association between the selected viewlets. For example, the activity sequence selected or defined by the user can also specify that the selected viewlets act on defined files. In one embodiment, the activity sequence defined by the user may specify that a first viewlet from a first application processes a file before a second viewlet from a second application acts on the file processed by the first application. This "sequence" and/or file related information is, optionally, also stored as a part of the user context.

It should be recognized that the three applications 140a–140c are exemplary only and a different number of applications could be used with a variable number of viewlets per application. Furthermore, the user context can be defined using one or more viewlets from some of the applications rather than from each of the applications as disclosed in FIG. 2.

The user 110 may need to log into the suit of applications (140a–140c) based on, for example, a single portal sign-on and can then use the personalization engine 100 to define a specific custom activity sequence relevant to a particular task. The personalization engine 100 presents the user with various application views (in the form of viewlets) to be selected by the user 110 as his preference. The user's 110 choice is stored in the user custom views repository 120 as a user context that can be accessed later. For example, the user 110 may access the personalization engine 100 to access and alter an existing user context if the user decides that a different sequence of viewlets is better suited for the user's task.

It is to be understood that one user may have one or more of such user contexts since one user may perform more than one task and, therefore, a user may have a different user context associated with each of his tasks. Furthermore, it should be recognized that a user context could also be defined for a user based on his "role" within a company or organization since users in a similar role often perform the same or similar tasks as other users in that role. For example, all users that are in a "salesman" role may perform one or more similar tasks and, therefore, user contexts can be defined for users based on their roles. Defining and accessing roles for users in the system and associating user contexts for roles is within the abilities of one skilled in the art in view of the teachings of the present invention.

Once the user 110 has defined his preferred activity sequences or viewlets, the personalization engine 100 receives the user's preferences in step 320 and creates a corresponding user context in step 330. Also, in step 330, the personalization engine 100 stores the user context in the custom views data store 120 so that the user context can be retrieved later to render a custom view to the user in accordance with the user's preference as discussed further herein.

As part of the user context, the personalization engine 100 also stores information related to the user's login to the various applications 140a–140c whose viewlets have been defined in the user context. For example, the user context could store the access control list information related to the user's access and permissions to the various application whose viewlets have been defined in the user context. That is, the personalization engine 100 could verify the access and permissions of the user to particular applications (or their viewlets) and only define these viewlets in the user context if the user 110 has sufficient access rights to the applications or the viewlets.

If required, user context could also record any userid or password information that may be necessary for the user to access the various applications, for example, the applications 140a–140c shown in FIG. 2. Therefore, one of the features of the present invention is that the user 110 does not need to separately login into the various applications whose viewlets have been defined in the user context. Accordingly, for example, a single portal login that permits access to the application system could also provide the user 110 access to all the applications 140a–140c whose viewlets are defined in one of the user contexts for the user 110.

Figure 4:
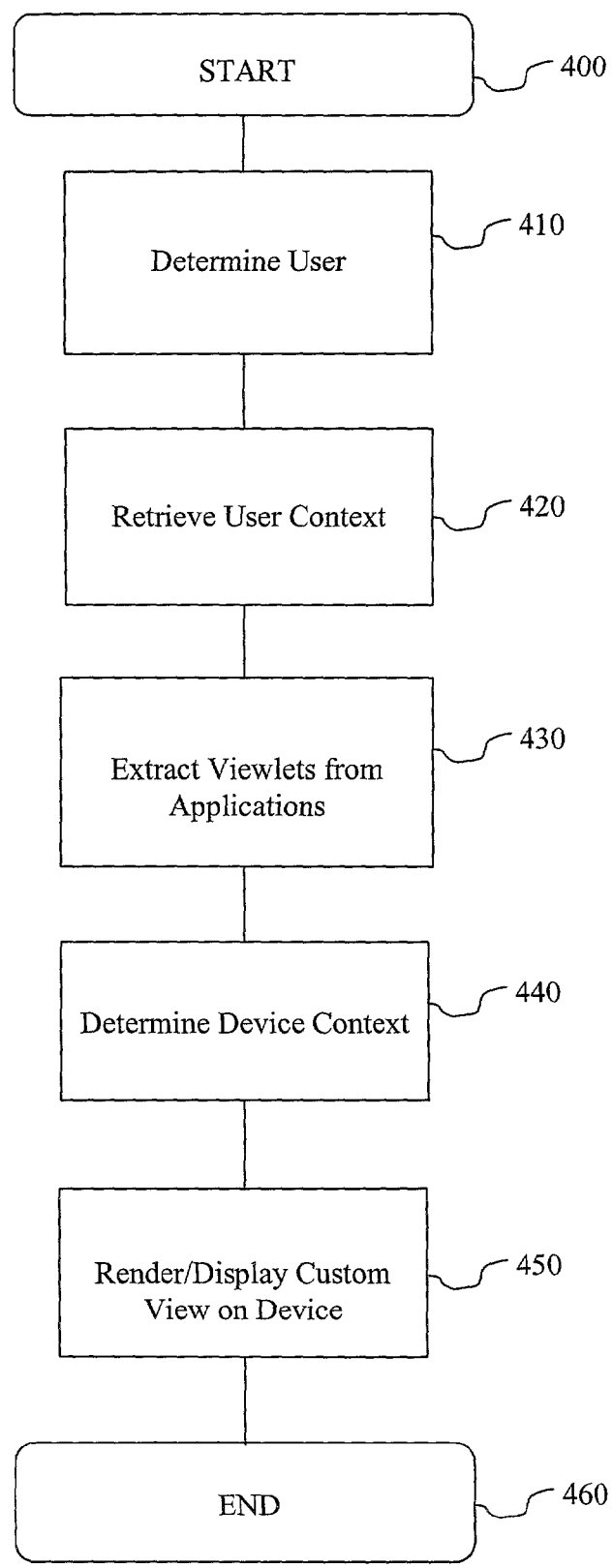
FIG. 4 is a flow chart illustrating a preferred embodiment of the method steps of rendering a custom view according to the present invention.

Once the user 110 has defined and stored a user context, one preferred embodiment of the steps for rendering a custom view are disclosed in FIG. 4. In step 410, the personalization engine 100 determines the identity of the user 110, for example, based on the portal sign on of the user 110 or by the user 110 providing a userid/password or any other identification information as would be recognized by those skilled in the art. In step 420, the personalization engine 100 retrieves the user context for the user 110 and provides it to the custom view generator 130 (or canvas). If the user 110 has more than one user context, the personalization engine determines and retrieves the appropriate user context based on a criteria, for example, based on a user selection or some other information provided by or related to the user (e.g., role of the user).

In step 430, the custom view generator 130 extracts the viewlets from the applications 140a–140c based on the user context. It should be understood that the custom view generator may itself need to verify the user access permissions before extracting the viewlets from the applications 140a–140c even though, in the preferred embodiment, the access permissions were verified before creation of the user contexts. Such a verification may be useful, for example, if the user's access permissions have been changed after the creation of the user context. Alternatively, the user context may be configured to dynamically access the users access permissions so that it uses the current access permissions of the user before providing access to any of the applications.

Instep 450, the custom view generator 130 renders (for example, displays) the custom view 135 on the user's preferred device 136 using a device context corresponding to the user that is determined in step 440. Therefore, the custom view can be displayed on one or more devices (e.g., in multimedia, audio, video, text, GUI, etc.) based on the custom view generator 130 determining the appropriate device context(s).

As one specific example of using the present invention, consider the Microsoft Office suite of applications (as examples of the multiple applications 140a–140c) each designed with a specific task in mind and having a distinct predefined set of steps for accomplishing that task. For example, MS Word ™ is a text document generation tool, MS Excel™ generates spreadsheets, MS Exchange™ is used for receiving and sending electronic mail, and MS PowerPoint™ is used for generating presentations.

As an example, consider an account analyst at a brokerage firm who has the task of, compiling some financial data received from a senior researcher and sending it out to a client. The analyst receives an email containing the financial data. The first task is to compile and aggregate the data. Therefore, a spreadsheet of the aggregated data needs to be generated. The analyst's next task is to produce some documentation explaining the contents of the spreadsheet and the transformations performed on the data received from the senior researcher. Finally, a presentation illustrating the data needs to be generated and sent out to specific clients via electronic mail.

It should be understood that each of these separate tasks can be performed by a viewlet of the respective applications. Therefore, for example, one viewlet (from the e-mail application) receives the financial information, another viewlet (from the spreadsheet application) provides the spreadsheet to transform the data and another viewlet (again from the e-mail application) enables sending the transformed data to the client list. The present invention contemplates that the user context stores not only the viewlets but, optionally, also the sequence and other information (for example, files or preferred setup or font information) that enables the selected viewlets (that form the custom view) to perform a defined task.

Even though each of these are simple activities, it requires that the account analyst have full knowledge or even a mastery of each application's predefined steps and functionality before being able to successfully complete this task. In addition, the analyst will have to launch each application and switch in and out of the applications as the task progresses, which is bothersome keeping in mind that the analyst's primary role is to analyze accounts and make recommendations to clients not to be a tool expert.

In this example, the analyst will have to launch Exchange, select the inbox tab and open the mail from the senior researcher, copy the data from the mail and save it. Then he must launch Excel and select a new spreadsheet, set up the desired preferences (font, line spacing, etc) and enter the data. He must then perform whatever operations he/she needs to then save it. The next step will be to launch Word, select a new word document, set up the desired preferences (font, line spacing etc) and begin creating the documentation to accommodate the data and then save it. To create the presentation the account analyst will then have to launch PowerPoint, set up the desired preferences (font, line spacing, etc) and create the presentation. Finally, Exchange will have to be launched to send out the compiled information to the client. At this point, it is clear that four separate and distinct applications have been launched and used by the account analyst with several steps replicated. If this is a task that this frequently performed by the analyst, the time spent performing and coordinating these disparate activities can become extensive.

The present invention allows the account analyst to select the functions that he/she may want to perform on each application from a single window since these functions would have been custom defined by the analyst and stored as a user context by the personalization engine 100. The user context would then have been rendered as a custom view by the custom view generator 130.

Therefore, the custom view 135 generated according to the present invention would provide a user interface (window) that would specify the following activity sequence (for example): Read Email, Create Spread Sheet, Create Document, Create Presentation, Send Email etc. The present invention provides a single window (or interface) where the analyst can select these preferred tasks (including sequences and preferences) and these are saved by the personalization engine 100 in a corresponding user context. Upon returning to the system, the analyst will only have to login and whatever his/her preferred tasks were would be present (i.e., rendered in his custom view based on the saved user context). To render the custom view, the present invention provides that the user context of the user would be retrieved and any separate logins to the applications would be performed. Thereafter, after successful login, the viewlets from the various applications (for example, Read Email viewlet from the MS Exchange application or Create Spread Sheet viewlet from the MS Excel application) would be used to generate a custom view for the analyst. Furthermore, any optional file or sequence information retrieved from the user context would enable the user to perform his task in a streamlined manner since the file and/or sequence information would be available to the viewlets selected by the user.

For example, using the custom view, the analyst may then select the "Read Email" option and all new emails would be available, he/she can then save the data from the email and select "Create Spread Sheet" and this would then provide a new spread sheet, for example, based on the stored data automatically accessed from storage. This process will be repeated for each step in the process until the final document is emailed to the client.

Therefore, the present invention solves the problem of having to launch and setup each application every time the account analyst wants to send data to his/her clients.

In another embodiment, the present invention provides that a user can have multiple custom views with viewlets from one application that are configured separately in each custom view. For instance, in the example discussed above, the account analyst may have two custom views that each use MS Word but the user preferences associated with MS Word in each custom view may be different. That is, the user may have one set of user preferences for MS Word in one custom view while having another set of user preferences for MS Word in another custom view. In each case, the respective user context for each custom view would store information regarding the respective user preferences. Examples of such user preferences for MS Word could include, styles, fonts, paragraph or page set up, etc.

Therefore, the present invention would allow the account analyst to automatically create MS Word documents with different user preferences for different sets of clients using different custom views. The different user preferences would be stored with the corresponding user contexts. Accordingly, the analyst could use one custom view for MS Word documents that have one set of user preferences so that the analyst could automatically create documents configured with the appropriate user preferences for one set of clients. The analyst could then use another custom view for MS Word documents that have another set of user preferences so that appropriately configured documents could be created for another set of clients. It should be noted that the analyst would only have to define the user preferences once for each custom view since the defined user preferences would be stored in the respective user context associated with that custom view. Thereafter, MS Word documents would be automatically configured with the user preferences stored in the user context associated with the custom view used to access the MS Word application.

One of the important features provided by the present invention is the ability for a system user to define custom activity sequences relevant to their current tasks at any time. Some of the benefits provided by the present invention include: reduction in training cost; reduction in user error; lower operational cost; reduction of task irrelevant steps; speed; reduction of number and skill of human resources; and improved usability.

Other embodiments of the invention will be apparent to those skilled in the art from a consideration of the specification and the practice of the invention disclosed herein. It is intended that the specification be considered as exemplary only, with the true scope and spirit of the invention being indicated by the following claims.

What is claimed is:

1. A computer implemented method of automatically generating and rendering a custom view including at least two viewlets from two different applications, the method comprising:

receiving a defined activity sequence from a user, wherein the activity sequence comprises at least two viewlets from two applications, respectively, wherein a viewlet represents a coherent set of operations performed by an application, and wherein each application is an ordered set of a plurality of viewlets;

associating the received activity sequence with the user;

storing the activity sequence and associated user as a user context in a data store, wherein the user context also stores a sequence of the viewlets in the activity sequence and other information that enable the viewlets together to perform a defined task; and rendering a custom view to the user based on the stored user context, wherein the custom view comprises an association between the at least two viewlets in the activity sequence, wherein the step of receiving the defined activity sequence for a user includes defining the activity sequence based on a role associated with the user, wherein the role associated with a user specifies membership in a group of users that perform similar functions; and wherein the step of receiving the defined activity sequence for a user includes providing suggestions to the user based on the role associated with the user.

2. The computer implemented method according to claim 1, wherein the step of receiving the activity sequence includes:

providing the user with a selection of available applications;

receiving user selections of applications;

providing the user with a list of viewlets for each of the applications selected by the user; and receiving the user selection of viewlets corresponding to the user's selection of applications.

3. The method according to claim 2, wherein the step of receiving the activity sequence includes:

providing suggestions to the user based on the applications selected by the user; and validating user selection of viewlets based on either the user or the applications selected by the user.

4. The computer implemented method according to claim 1, wherein the step of storing the activity sequence as a user context includes storing information related to the user's login to the two applications.

5. The computer implemented method according to claim 4, wherein the information related to the user's login to the two applications comprises an access control list.

6. The computer implemented method according to claim 1, wherein the step of rendering a custom view includes:

retrieving the user context for the user;

extracting viewlets from applications based on user context; and generating the custom view using the extracted viewlets and a device context corresponding to the device used for rendering to the user.

7. The computer implemented method according to claim 4, wherein the step of rendering a custom view further includes:

retrieving the user context for the user;

logging into the two applications based on information related to the user's login to the two applications stored with the user context;

upon successful logging in, extracting viewlets from the applications based on retrieved user context; and generating the custom view for rendering using the extracted viewlets and a device context corresponding to the device used for rendering to the user.

8. A tangible computer readable data storage medium having program code recorded thereon that is executable by a computer for rendering a custom view including at least two viewlets from two different applications, the program code configured to cause the computer to perform the following steps:

receiving a defined activity sequence from a user, wherein the activity sequence comprises at least two viewlets from two applications, respectively, wherein a viewlet represents a coherent set of operations performed by an application, and wherein each application includes an ordered set of a plurality of viewlets;

associating the received activity sequence with the user;

storing the activity sequence and associated user as a user context in a data store, wherein the user context also stores a sequence of the viewlets in the activity sequence and other information that enable the viewlets together to perform a defined task; and rendering a custom view to the user based on the stored user context, wherein the custom view comprises an association between the at least two viewlets in the activity sequence, where in the step of receiving the defined activity sequence for a user includes defining the activity sequence based on a role associated with the user, wherein the role associated with a user specifies membership in a group of users that perform similar functions; and wherein the step of receiving the defined activity sequence for a user includes providing suggestions to the user based on the role associated with the user.

9. The computer readable data storage medium according to claim 8, wherein the step of receiving the activity sequence includes:

providing the user with a selection of available applications;

receiving user selections of applications;

providing the user with a list of viewlets for each of the applications selected by the user; and receiving the user selection of viewlets corresponding to the user's selection of applications.

10. The computer readable data storage medium according to claim 9, wherein the step of receiving the activity sequence includes:

providing suggestions to the user based on the applications selected by the user; and validating user selection of viewlets based one either the user or the applications selected by the user.

11. The computer readable data storage medium according to claim 8, wherein the step of storing the activity sequence as a user context includes storing information related to the user's login to the two applications.

12. The computer readable data storage medium according to claim 11, wherein the information related to the user's login to the two applications comprises an access control list.

13. The computer readable data storage medium according to claim 8, wherein the step of rendering a custom view includes:

retrieving the user context for the user;

extracting viewlets from applications based on user context; and generating the custom view for rendering using the extracted viewlets and a device context corresponding to the device used for rendering to the user.

14. The computer readable data storage medium according to claim 11, wherein the step of rendering a custom view further includes:
   retrieving the user context for the user;
   logging into the two applications based on information related to the user's login to the two applications stored with the user context;
   upon successful logging in, extracting viewlets from the applications based on retrieved user context; and
   generating the custom view for rendering using the extracted viewlets and a device context corresponding to the device used for rendering to the user.

15. A system for automatically generating and rendering a custom view including at least two viewlets from two different applications, the system comprising:
   a personalization engine that receives a defined activity sequence from a user, wherein the activity sequence comprises at least two viewlets from two applications, respectively, the personalization engine associating the received activity sequence with the user as a user context, wherein a viewlet represents a coherent set of operations performed by an application, and wherein each application is an ordered set of a plurality of viewlets;
   a custom view data store that stores the user context, wherein the user context also stores a sequence of the viewlets in the activity sequence and other information that enable the viewlets together to perform a defined task; and
   a custom view generator that renders a custom view to the user based on the stored user context, wherein the custom view comprises an association between the at least two viewlets in the activity sequence,
   wherein the personalization engine provides suggestions to the user, based on a role of the user, to define the activity sequence for the user, and
   wherein the role associated with a user specifies membership in a group of users that perform similar functions.

16. The system according to claim 15, wherein the personalization engine is configured to provide the user with a selection of available applications, receive user selections of applications, provide the user with a list of viewlets for each of the applications selected by the user, and receive the user selection of viewlets corresponding to the user's selection of applications.

17. The system according to claim 16, wherein the personalization engine is further configured to provide suggestions to the user based on the applications selected by the user, and validate a user's selection of viewlets based on either the user or the applications selected by the user.

18. The system according to claim 15, wherein the personalization engine is configured to define the activity sequence based on a role associated with the user, wherein the role associated with a user specifies membership in a group of users that perform similar functions.

19. The system according to claim 15, wherein the personalization engine also associates the user's login information to the applications with the user context.

20. The system according to claim 19, wherein the user's login information comprises an access control list.

21. The system according to claim 15, wherein the custom view generator is configured to retrieve the user context for the user, extract viewlets from applications based on the retrieved user context, and generate the custom view for rendering using the extracted viewlets and a device context corresponding to the device used for rendering to the user.

22. The system according claim 19, wherein the custom view generator is configured to retrieve the user context for the user, log into the two applications based on the information related to the user's login stored with the user context, upon successful login, extract viewlets from applications based on the retrieved user context, and generate the custom view for rendering using the extracted viewlets and a device context corresponding to the device used for rendering to the user.

23. A system for automatically generating and rendering a custom view including at least two viewlets from two different applications, the system comprising:
   means for receiving a defined activity sequence from a user, wherein the activity sequence comprises at least two viewlets from two applications, respectively, wherein a viewlet represents a coherent set of operations performed by an application, and wherein each application is an ordered set of a plurality of viewlets;
   means for associating the received activity sequence with the user;
   means for storing the activity sequence and associated user as a user context in a data store, wherein the user context also stores a sequence of the viewlets in the activity sequence and other information that enable the viewlets together to perform a defined task; and
   means for rendering a custom view to the user based on the stored user context, wherein the custom view comprises an association between the at least two viewlets in the activity sequence,
   wherein the means for receiving a defined activity sequence comprises means for providing suggestions to the user, based on a role of the user, to define the activity sequence for the user, and
   wherein the role associated with a user specifies membership in a group of users that perform similar functions.

* * * * *